Dec. 15, 1959  R. L. ESKEN  2,916,830
GAGING APPARATUS
Filed April 17, 1956  2 Sheets-Sheet 1
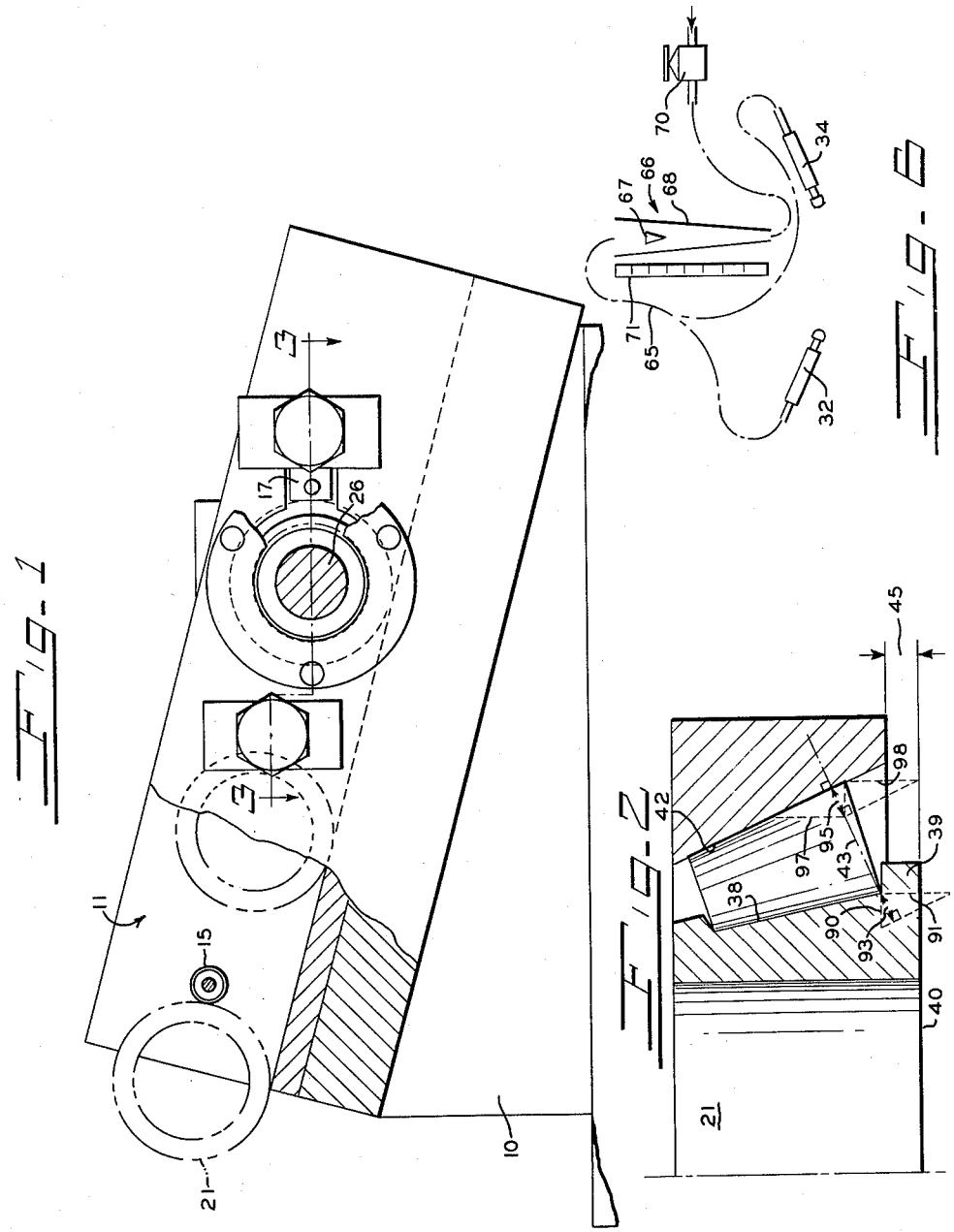
INVENTOR.
Robert L. Esken
BY
Edward J. Noe Jr.

Dec. 15, 1959  R. L. ESKEN  2,916,830
GAGING APPARATUS
Filed April 17, 1956  2 Sheets-Sheet 2
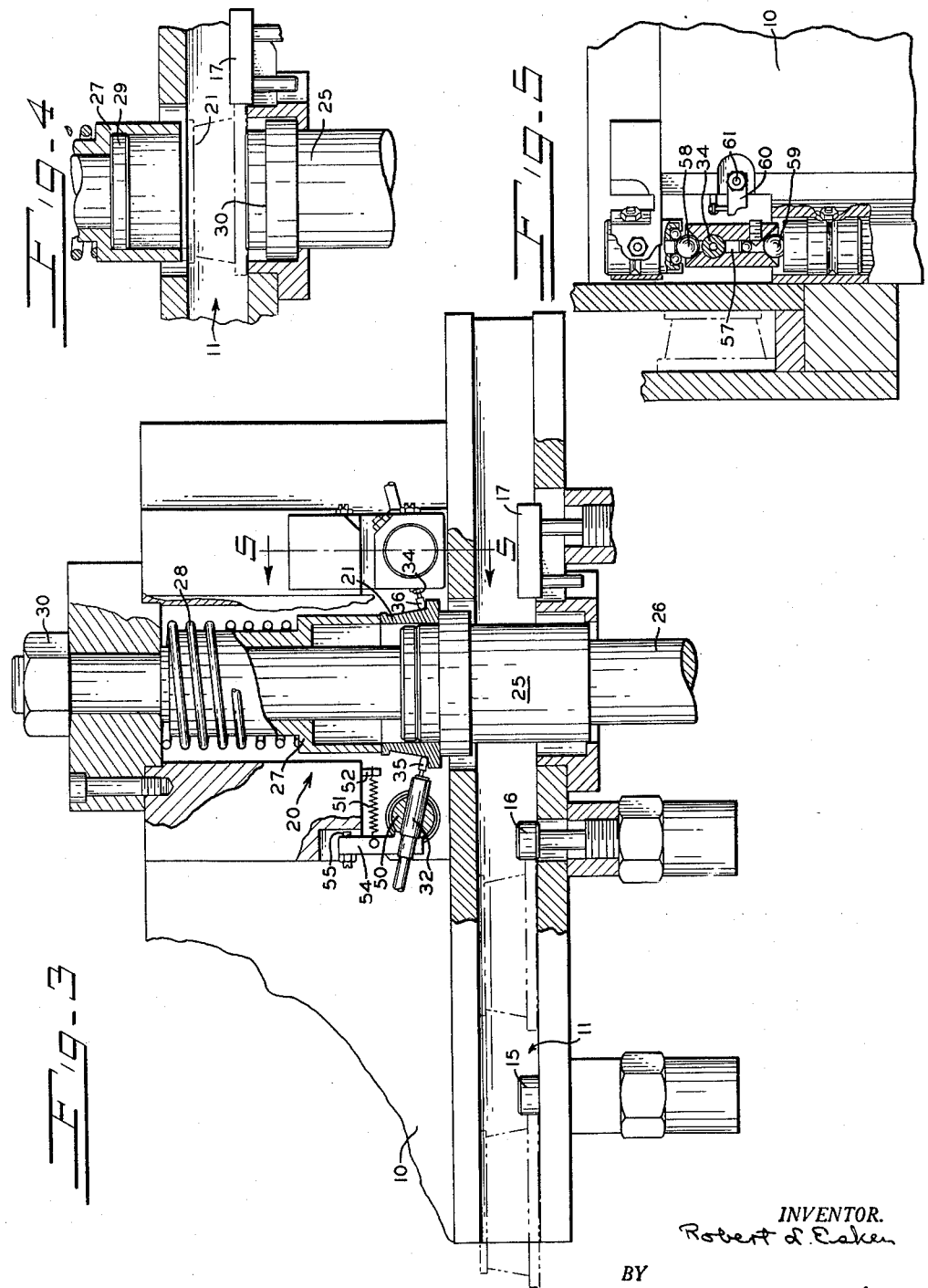
INVENTOR.
Robert L. Esken
BY
Edward J. Noe Jr.

United States Patent Office 2,916,830
Patented Dec. 15, 1959

2,916,830

GAGING APPARATUS

Robert L. Esken, Dayton, Ohio, assignor, by mesne assignments, to The Sheffield Corporation, a corporation of Delaware Application April 17, 1956, Serial No. 578,776

13 Claims. (Cl. 33—174)

This invention relates to gaging devices and more particularly to an apparatus for gaging bearing components and the like.

It is an object of this invention to provide an apparatus wherein a part to be gaged is held in a reference position and the projected displacements of a part corner or the like along a line of gaging are measured irrespective of displacements of the gaged part portion transverse that line.

It is a further object to provide a simple apparatus for rapidly gaging with high precision dimensional characteristics of parts such as those characteristics of a roller bearing cone which affect the amount of standout of the cup backface from the adjacent end of a cone in an assembled bearing.

It is a further object to provide such an apparatus wherein a gaging work contactor engaging the intersection or corner at the junction of the inner raceway and backface rib of a roller bearing cone is carried for gaging movement substantially perpendicular to the raceway of a nominal cup and for movement substantially transverse the line of gaging.

It is a further object to provide an apparatus for such gaging operations wherein a part such as a roller bearing cone is moved axially into a gaging station and is ejected from the station following gaging by a resiliently loaded sleeve or the like engaged and forced inwardly by the part during loading.

Other objects and advantages of the invention will be apparent from the following description, the appended claims, and the accompanying drawings, in which, Figure 1 is a view, in elevation, of a chute and escapement assembly of a gaging apparatus embodying the present invention, Figure 2 diagrammatically illustrates a portion of a conventional tapered roller bearing assembly, indicating the condition gaged through the present invention, Figure 3 is a sectional view on line 3—3 of Figure 1, showing in detail the gaging apparatus, with a bearing cone in gaging position, Figure 4 is a fragment of the section of Figure 3 with a bearing cone in loading position, Figure 5 is a sectional view on line 5—5 of Figure 3, illustrating the pivotal support for one of the gage heads, and Figure 6 is a diagram of an exemplary gaging circuit.

In a tapered roller bearing assembly the displacement between the backface of the bearing cone (face at the larger end) and the adjacent end of the bearing cup is called "standout." This dimension is critical in certain bearing applications. With the apparatus of the present invention certain dimensional characteristics of a bearing cone are gaged in an extremely simple manner to determine the standout when the particular gaged cone is assembled with nominal rollers and a nominal cup.

The cone is located radially in a gaging station and its axial position is determined by a locating surface engaging the cone backface. One or more gage heads supported in the station carry work contactors engaging the cone at the intersection of the raceway and the adjoining backface rib surface. The work contactors are movable in directions substantially perpendicular to the surface of a nominal outer raceway and the gage heads themselves are mounted for transverse movement to allow the work contactors to locate at the gaged intersection. The gage heads in this example are connected to an indicator which will indicate the standout if the gaged cone were assembled with nominal rollers and a nominal cup.

While the present invention has particular application and will now be described in detail with reference to the gaging of tapered roller bearing characteristics it will be understood that the invention is not limited to the precise apparatus illustrated and would have application in other and materially different situations.

In the illustrated apparatus a base 10 supports a chute 11 adapted for connection to a grinding machine or the like producing tapered roller bearing cones. Escapement stops 15, 16 and 17 are air actuated in a conventional manner to control the movement of cones down chute 11 to and from alignment with gaging station 20. In Figure 4 a cone 21 is shown in alignment with the station and held in that position by engagement with stop 17.

Loading plunger 25, shown retracted in Figure 4, is actuated by an air cylinder through a connecting rod 26 in a conventional manner and in timed relation with the actuation of the escapement stops. As plunger 25 is extended, its smaller pilot portion enters the internal diameter of the cone 21 and carries it transversely from chute 11 into the gaging station. The inner end of the cone strikes a sleeve 27 urged outwardly by spring 28 and moves the sleeve inward as the cone is loaded. The cone is radially positioned as it slides over the chamfered outer end of guide or receiving spindle 29 which is fixed in the gaging station by nut 30 on its threaded inner end. The enlarged outer portion of guide spindle 29 also serves to limit the outward movement of ejection sleeve 27.

Flange 30 on loading plunger 25 engages the cone backface and determines the axial position of the cone within the gaging station when plunger 25 abuts the outer face of spindle 29. Thus a cone is moved into station 20 and is located radially and axially for gaging.

Gage heads 32 and 34 are carried in station 20 and their respective work contactors 35 and 36 are disposed for engagement with the intersecting raceway 38 and backface rib 39 of cone 21 (see Figure 2) as the cone moves into the station. The cone backface is indicated at 40 in this figure.

By measuring the effective displacements of this intersection in a direction substantially perpendicular to the outer raceway 42, by means of work contactors positioned both in that direction and transverse thereto by engagement with the intersecting surfaces of inner raceway 38 and backface rib 39, the gaging results will be determined by those dimensional characteristics of cone 21 which will determine bearing standout 45 when the gaged cone is assembled with nominal rollers and a nominal cup.

Each gage head is carried to dispose the respective work contactor for movement substantially perpendicular to a nominal outer raceway and the gage head body can float transverse the gaging direction. As seen in Figure 3 gage head 32 is mounted in a supporting shaft 50 biased in a clockwise direction to dispose work contactor 35 for proper engagement with the cone intersection as the cone moves into gaging station 20. Spring 51 connected between pin 52 and arm 54 on shaft 50 maintains stop 55 in engagement with a surface on base 10 to determine the reference position of work contactor 35 when inactive in gaging. Gage head 34 is similarly mounted and the details of its support are shown most particularly in Figure 5. Supporting shaft 57 for gage head 34 is carried between bearing assemblies 58 and 59 for free pivoting. Arm 60, a fragment of which is shown in Figure 5, is biased to carry a stop 61 into engagement with a reference surface on base 10 to determine the non-gaging position of work contactor 36.

In this manner work contactors 35 and 36 are carried for movement along a gaging direction substantially perpendicular to the outer raceway of a nominal cup. While the gage heads are pivotally mounted in this example the pivot axes are remote from the points of gaging and because of the minute tolerances involved the gaging results are not substantially affected thereby. Other equivalent mounts could be provided to support the gage heads for movement transverse the direction of gaging to accommodate variations in the location of the gaged intersection while the work contactors move within the gage head bodies only in response to variations along the line of desired gaging.

Referring to Figure 2 it will be seen that a displacement of the gaged intersection along line 90 (reduction in diameter at the intersection) or along line 91 (reduction in rib thickness) will produce the same amount of work contactor displacement as represented at 93 along line 43. All displacements are, of course, much exaggerated for purpose of illustration.

By constructing similar triangles with line portion 95 equaling the gaged displacement 93 it will be seen that line 97, representing standout variation due to change in diameter, equals line 98 representing standout variation due to variation in rib thickness. Combinations of these displacements are similarly gaged to determine standout.

The gage heads in this application are of a pneumatic type having leakage orifices controlled by the movement of the respective work contactors relative to the gage head bodies and can be, for example, of the construction shown in Patent No. 2,691,827, issued October 19, 1954. Figure 6 is a diagram of an exemplary air circuit wherein both gage heads 32 and 34 are connected through conduit 65 with an indicating instrument 66 responsive to the total flow therethrough. In such instruments a light indicating float 67 is movable within an internally tapered transparent flow tube 68 connected to regulator 70 and the float indicates the velocity of flow upward through the tube as determined by the leakage through the orifices of the gage heads. A suitable scale 71 can be provided and calibrated in terms of bearing standout. While a pair of substantially opposed gage heads of a pneumatic type have been illustrated and described, other numbers of gage heads can be employed and of a materially different character if desired.

Following gaging loading plunger 26 retracts and ejection sleeve 27 moves race 21 from gaging position in station 20 back into chute 11. Upon retraction of escapement stop 17 the gaged cone is released for further movement down the chute.

Thus it is seen that a gaging apparatus has been provided for performing a difficult gaging operation in an extremely simple manner. Two variables are simultaneously gaged in such a way as to only take into account those factors which influence the particular desired characteristic to be determined. Through the unique gaging arrangement cone standout and like conditions can be gaged rapidly and accurately without involving repeated or sequential gaging operations or complicated mechanisms.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for gaging the disposition of a pair of angularly related annular surfaces on a part, said surfaces being coaxial and lying in intersecting planes, said apparatus comprising a base, locating means on said base for engaging a reference portion of the part and for locating a part coaxial with a reference axis of the apparatus, a plurality of gage heads, each including a body and a work contacting element rectilinearly movable within said body for engagement with both said surfaces, gage head support means on said base carrying the gage heads equally spaced about said reference axis at a common axial location therealong for association with spaced points about the part, said support means including means carrying said gage head bodies for movement of the associated work contacting elements in directions equally inclined relative to said reference axis in planes radial to said reference axis and mounting each gage head body for floating movement in the respective gaging plane transverse the direction of movement of the respective element during gaging to a position determined by the location of said surfaces on the part, and a single gaging means connected to all said gage heads responsive to the conjoint positions of the work contacting elements within the respective gage head bodies along the lines of gaging.

2. Gaging apparatus as set forth in claim 1 wherein the support means for each gage head body includes means carrying the gage head body for pivoting movement during gaging about an axis perpendicular to the line of movement of the respective work contacting element and at a point remote from the gaging contact zone.

3. Gaging apparatus as set forth in claim 2 further comprising means resiliently pivoting each gage head body in a given direction about the respective pivot axis, and stop means for limiting the extent of pivoting in the given direction at a desired reference position beyond the gaging position.

4. Apparatus of the character described comprising a base, means on said base for locating a bearing cone on a predetermined reference axis of the apparatus for gaging and including means for locating the cone along that axis by engagement with the cone backface, a plurality of gage heads each including a movable work contactor, means carrying said gage heads on said base equally spaced about the reference axis of the apparatus and with the work contactors disposed for engagement with the coaxial intersecting inner raceway and backface rib surfaces of the bearing cone at spaced points therealong, the carrying means for each gage head disposing the respective work contactor for gaging movement in a plane radial to said reference axis and along a line inclined relative to said axis and substantially perpendicular to a plane defined by a nominal outer raceway of a bearing cup adapted for assembly with said cone on said reference axis, said carrying means including means mounting each respective gage head for floating movement transverse the direction of work contactor movement and in the plane of gaging movement during a gaging operation, and gaging means operatively connected to all said gage heads and controlled by the conjoint responses thereof.

5. Gaging apparatus as set forth in claim 4 wherein the carrying means for each of said gage heads includes means carrying the gage head for pivoting movement about an axis perpendicular to the line of work contactor movement and at a point remote from the gaging zone.

6. Gaging apparatus as set forth in claim 4 further comprising means resiliently biasing said gage heads in a common direction in their transverse movements, and stop means for limiting the biased movement to determine a reference position beyond the gaging position of each work contactor for engagement with the gaged surfaces when a part is placed in gaging position.

7. Gaging apparatus as set forth in claim 4 wherein said locating means includes a receiving spindle, a loading plunger for engagement with the cone backface to move the cone axially over said receiving spindle, an ejection sleeve co-axial with said receiving spindle for engaging the cone frontface, and resilient means for extending said sleeve to remove a cone upon retraction of said loading plunger.

8. Gaging apparatus as set forth in claim 4 wherein each of said gage heads includes a fluid leakage orifice and an orifice controlling surface positioned by the respective work contactor, and means for connecting each of said orifices to a common indicator and a source of air under controlled pressure.

9. Apparatus of the character described comprising a base, means on said base for locating a bearing cone in a predetermined position along a reference axis of the apparatus for gaging and including means for positioning the cone axially by engagement with the cone backface, a plurality of gage heads on said base, each of said gage heads including a body and a work contactor rectilinearly movable relative thereto, means supporting said gage heads about the reference axis of the apparatus at a common axial location therealong and with the respective work contactors disposed for engagement with the intersection of the surfaces of the coaxial intersecting inner raceway and the backface rib, at spaced points therealong the support means for each gage head body disposing the respective work contactor for movement along a gaging line inclined relative to the cone backface and the reference axis of the apparatus and for floating movement transverse the line during gaging in a plane radial to the reference axis of the apparatus, and a gaging system operatively connected to said gage heads and controlled by the conjoint responses thereof.

10. A tapered roller bearing gage comprising a base, a spindle on said base for locating engagement with the internal bore of a bearing cone to dispose the cone on a reference axis of the apparatus, stop means extending traverse the axis of said spindle for locating the cone axially by engagement with the cone backface, a plurality of gage heads, means on said base carrying each of said gage heads in respective gaging planes radial to said axis and equally spaced about said spindle at common axial locations therealong during gaging, said gage heads including work contactors movable at substantially uniform inclined angles to said axis within the respective gaging planes and disposed for simultaneous positioning engagement with the inner raceway and backface rib intersection of a cone located by said spindle and stop means, said carrying means including means mounting each of said gage heads for floating movement transverse the axis of work contactor movement and in the respective gaging planes and a gaging means connected to said gage heads conjointly controlled thereby.

11. Apparatus of the character described comprising a base, means on said base for locating a bearing cone coaxial with a predetermined reference axis of the apparatus for gaging and including a locating stop extending transverse said axis for engaging and locating the cone backface at a predetermined disposition along said axis, a work contactor, means on said base carrying said work contactor for positioning engagement with the intersection of the inner raceway and backface rib of the bearing cone and for movement within a plane radial to said reference axis, gaging means responsive to movements of said work contactor within the gaging plane along a gaging direction inclined relative to said axis and substantially perpendicular to a line defined by the intersection of said plane with an imaginary plane determined by a nominal outer raceway of a bearing cup adapted for assembly to said cone and located coaxially on said reference axis, said carrying means allowing floating movement of said work contactor in the gaging plane transverse the gaging direction to a position determined by the disposition of said intersecting inner raceway and backface rib surfaces relative to the cone backface, said carrying means including means biasing said work contactor generally along said axis to a non-gaging position beyond the range of gaging movement whereby the work contactor is engaged and moved both along said axis and radially thereof in the gaging plane during a gaging operation.

12. Apparatus for gaging a cone of a tapered roller bearing adapted for cooperation with a bearing cup having a known nominal raceway comprising a base, means on said base for supporting and locating a bearing cone to be gaged coaxial with a reference axis of the apparatus, a work contactor for positioning engagement with the intersection of the inner raceway and backface rib surfaces of a bearing cone so disposed, means carrying said work contactor for movement within a gaging plane radial to said reference axis, gaging means responsive to movements of said work contactor in said gaging plane in a direction substantially perpendicular to a line determined by the intersection of said plane with an imaginary plane defined by a nominal outer raceway coaxial with said reference axis, said carrying means supporting said work contactor for floating movement transverse the gaging direction in the gaging plane and yieldably disposing said work contactor axially beyond the range of gaging movement for reception of a cone to be gaged, said locating means including a locating stop extending transverse said axis for engaging and locating the cone backface at a predetermined disposition along said reference axis and relative to the carrying means for said work contactor, whereby said work contactor is engaged and moved both along said axis and radially thereof upon positioning of a cone for gaging and measurements are made only along said gaging direction.

13. Apparatus for gaging a cone of a tapered roller bearing adapted for cooperation with a bearing cup having a known nominal raceway comprising a base, means on said base for supporting and locating a bearing cone to be gaged coaxial with a reference axis of the apparatus, a plurality of work contactors for simultaneous positioning engagement with the intersection of the inner raceway and backface rib surfaces of a bearing cone so disposed, means carrying said work contactors for movement within respective gaging planes radial to said reference axis and equally spaced thereabout, gaging means responsive to movements of each of said work contactors in the respective gaging planes in a direction substantially perpendicular to a line determined by the intersection of the respective plane with an imaginary annular plane defined by a nominal outer raceway coaxial with said reference axis, said carrying means supporting each work contactor for floating movement transverse its gaging direction in the gaging plane and yieldably disposing each work contactor axially beyond the range of gaging movement for reception of a cone to be gaged, said locating means including a locating stop extending transverse said axis for engaging and locating the cone backface at a predetermined disposition along said reference axis and relative to the carrying means for said work contactors, whereby said work contactors are engaged and moved both along said axis and radially thereof upon positioning of a cone for gaging and measurements of the disposition of said intersection relative to said stop and reference axis are simultaneously made along the respective gaging directions, and means conjointly responsive to said gaging means and the bearing standout of said cone when assembled with a nominal cup.

References Cited in the file of this patent

UNITED STATES PATENTS

| | | |
|---|---|---|
| 941,297 | Barthelmes | Nov. 23, 1909 |
| 1,317,459 | Rouanet | Sept. 30, 1919 |
| 1,491,613 | Miller | Apr. 22, 1924 |
| 2,010,144 | Dundon | Aug. 6, 1935 |
| 2,495,891 | Davis | Jan. 31, 1950 |
| 2,573,843 | Hendrix | Nov. 6, 1951 |

(Other references on following page)

UNITED STATES PATENTS

| | | |
|---|---|---|
| 2,594,077 | Schulze | Apr. 22, 1952 |
| 2,599,835 | Johnson | June 10, 1952 |
| 2,638,680 | Baker | May 19, 1953 |
| 2,648,135 | Gates | Aug. 11, 1953 |
| 2,657,468 | Lyons | Nov. 3, 1953 |
| 2,825,974 | Algatt | Mar. 11, 1958 |

FOREIGN PATENTS

| | | |
|---|---|---|
| 605,041 | Germany | Nov. 2, 1934 |
| 887,651 | France | Nov. 19, 1943 |

OTHER REFERENCES

Product Engineering, p. 224, March 1953.